Jan. 1, 1957 W. ASSMUS 2,776,135
SPRINGING OF ROAD VEHICLES
Filed Sept. 4, 1953
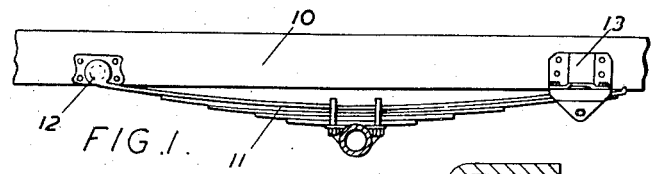
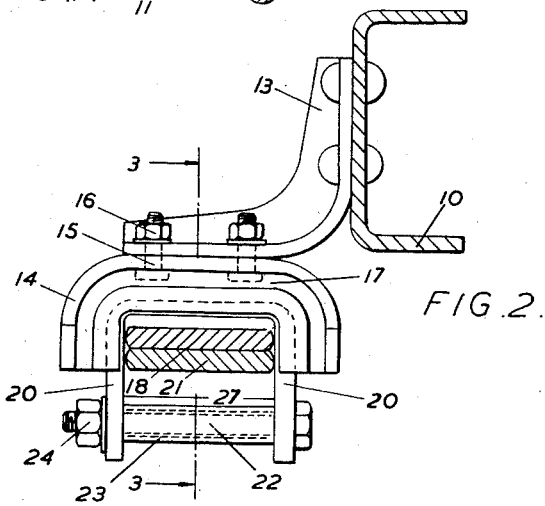
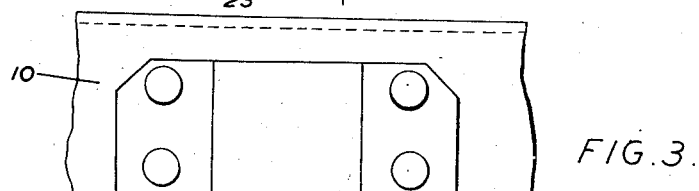
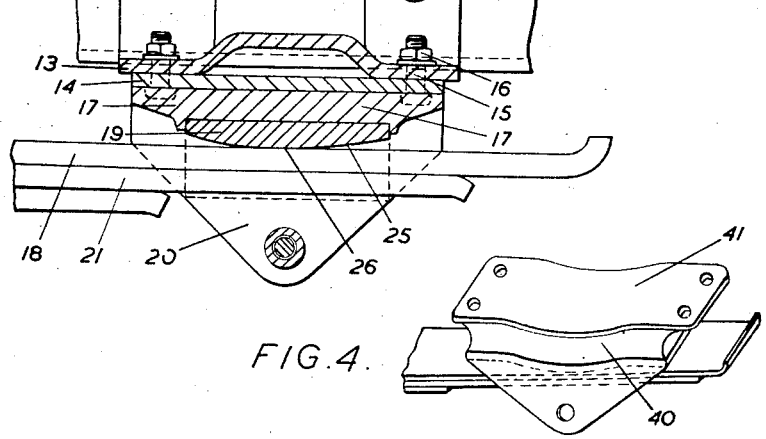
Inventor
Waldemar Assmus
By
J. E. Jones
Attorney

United States Patent Office 2,776,135
Patented Jan. 1, 1957

2,776,135

SPRINGING OF ROAD VEHICLES

Waldemar Assmus, Russelsheim (Main), Germany, assignor to General Motors Corporation, Detroit, Mich., a corporation of Delaware Application September 4, 1953, Serial No. 378,591

6 Claims. (Cl. 267—30)

This invention relates to spring suspension systems for motor vehicles.

One end of a spring incorporated in such a system is often attached by an eye at one end to a pin on the frame of the vehicle, and it has been proposed to guide the spring at the other end for longitudinal displacement in a slide member rigidly secured to the frame. The disadvantage of this construction is however that unavoidable transverse vibrations of the leaf springs are transmitted to the frame and to the body when the vehicle is in motion and produce troublesome noises.

The present invention minimizes this disadvantage by mounting the slide member resiliently upon the frame.

A particular feature of the invention is a rubber block between a slipper resting on the uppermost spring leaf and bracket on the frame the rubber block being vulcanized to the slipper and bracket.

The scope of the invention is defined by the appended claims; and how it can be carried into effect is hereinafter, particularly described with reference to the accompanying drawings, in which:

Figure 1 is a side elevation, partly in section, of part of the rear portion of a motor vehicle, having a spring suspension according to the invention;

Figure 2 is a transverse section of one end of the spring shown in Figure 1;

Figure 3 is a section on the line 3—3 of Figure 2; and

Figure 4 is a perspective view of the rear portion of a modified form of spring suspension according to the invention.

The frame of the vehicle shown in Figure 1 has a longitudinal side frame member 10 connected to an axle casing by a half-elliptic spring 11, which has an eye at its front end. The eye is mounted on a pin 12 secured to the side member 10. The rear end of the spring is guided for longitudinal displacement upon a slide-member consisting of a slipper 19, of U-shaped cross-section, supported on a U-shaped rubber pad 17 vulcanized to the slipper and to a pocket 14 of U-shaped cross-section which is attached to a spring support bracket 13, by means of bolts 15 and nuts 16. The bracket 13 is riveted to the frame member 10. The pocket 14 receives the rubber pad 17 and the slipper 19 which transmits load to the uppermost spring leaf 18.

The limbs 20 of the slipper 19 embrace the two uppermost spring leaves 18 and 21, which are prevented from escaping by a bolt 22, spacing sleeve 23 and nut 24, which rigidly unite the two downwardly turned limbs 20.

The bearing surface 25 of the slipper 19 is made slightly downwardly convex in its middle portion and is of greater convexity towards the ends.

When the spring 11 deflects under load, the line of contact 26 between the slipper 19 and spring leaf 18 shifts towards the left from the mid-position indicated in Figure 3, and the slipper 19 adapts itself to the inclined position of the spring leaf 18 owing to the resilient nature of the rubber pad 17.

This arrangement contrasts with known arrangements in which a slide member is rigidly fixed to the frame of a vehicle, in that by the present arrangement the line of contact moves towards the left by a considerably smaller amount than in known arrangements. As a result, the sliding face of the slipper 19 need be only slightly downwardly convex, thereby ensuring favorable contact conditions and small surface pressure between the slipper 19 and the spring leaf 18. Furthermore, the vertical vibrations, as well as those longitudinal vibrations, are damped by the rubber pad 17.

These vertical and longitudinal vibrations however do not generally give rise to rattles in the vehicle because the spring leaves 18 and 21 normally rest firmly on the slipper 19 on account of the load of the vehicle and only lift off very rarely under extraordinary circumstances.

On the other hand, the forces acting on the spring 11 transverse to the direction of travel produce small vibrations which allow the spring leaves 18 and 21 to strike against the insides 27 of the limbs 20 of the slipper 19 owing to the clearance between the leaves and the slipper 19. However, as the slipper 19 is embraced by the rubber pad 17 and as the latter is secured laterally by the downward limbs of the U-shaped pocket 14, the vibrations are not transmitted to the side frame member 10 and from the body of the vehicle and noises due to rattle are diminished at their place of origin due to the smallness of the vibrating masses.

The rubber pad 17 ensures that very small vibratory movements of the spring 11 are directly absorbed by the rubber so that no displacement occurs between the slipper 19 and the spring leaves 18 and 21, so reducing the wear between the leaf and the slide member.

In the modification illustrated in Figure 4, the suspension system is similar to that shown in Figures 1, 2 and 3 except that the U-shaped pocket 14 is replaced by a flat plate 41 and the rubber pad 17 by a flat rubber block 40.

This arrangement, however, is only suitable for light vehicles, as the rubber block 40 must resist the lateral forces acting on the vehicle in shear. According to the degree of lateral stability required, therefore, it is desirable for the plate 41 to have downwardly directed limbs at the sides so that the rubber block is stressed more in tension and compression, than in shear.

I claim:

1. A vehicle suspension system comprising in combination a vehicle frame, an axle housing, a load-carrying leaf spring, means for pivotally attaching one end of said spring to said frame, means for attaching said spring to said axle housing, a U-shaped slide member having a slightly downwardly convex contact face for guiding the other end of said spring for longitudinal displacement relative to said frame, a U-shaped member secured to said frame in the vicinity of said other end of said spring and a U-shaped rubber pad disposed between, and secured to, said slide member and said U-shaped member.

2. A vehicle suspension system comprising in combination a vehicle frame, an axle housing, a load-carrying leaf spring, means for pivotally attaching one end of said spring to said frame, means for attaching said spring to said axle housing, a U-shaped slide member having downwardly directed walls engaging the side edges of said spring for guiding longitudinal displacement thereof relative to said frame, a U-shaped member secured to said frame in the vicinity of said other end of said spring and a U-shaped rubber pad disposed between, and secured to, said slide member and said U-shaped member.

3. A vehicle suspension system comprising in combination a vehicle frame, an axle housing, a load-carrying leaf spring, a pin on said frame to receive an eye on one end of said spring to connect said spring to said frame, means for attaching said spring to said axle housing, a U-shaped slide member having a slightly downwardly convex contact face for guiding the other end of said spring for longitudinal displacement relative to said frame, a U-shaped member secured to said frame in the vicinity of said other end of said spring and a U-shaped rubber pad disposed between, and secured to, said slide member and said U-shaped member.

4. A vehicle suspension system comprising in combination a vehicle frame, an axle housing, a load-carrying leaf spring, means for connecting one end of said spring to said frame, means for attaching said spring to said axle housing, a U-shaped slide member having a slightly downwardly convex contact face for guiding the other end of said spring for longitudinal displacement relative to said frame and having downwardly directed limbs to limit lateral displacement of said spring, a U-shaped rubber pad embracing and secured to said slide member and a U-shaped member embracing and secured to said rubber pad and secured to said frame in the vicinity of said other end of said spring.

5. A resilient slide member structure for guiding one end of a load-carrying leaf spring of a vehicle for longitudinal displacement comprising a U-shaped pocket member for attachment to the frame of the vehicle, a U-shaped rubber pad bedded in and vulcanized to said pocket member and a U-shaped slipper bedded in and rigidly united by vulcanization to said rubber pad and having a slightly downwardly convex contact guide face.

6. In a vehicle suspension system comprising, in combination, a vehicle frame, an axle housing, a load carrying leaf spring, a pin on said frame to receive an eye on one end of said spring to connect said spring to said frame, means for attaching said spring to said axle housing, a slide member, laterally spaced walls on said member for guiding the other end of said spring longitudinally, said slide member having a top wall formed with a downwardly facing convex spring contact face engaging the face of said leaf spring, a plate secured to said frame, and a resilient pad bonded between said plate and the top wall of said slide member to cushion vibrations of the latter.

References Cited in the file of this patent

UNITED STATES PATENTS

| 1,617,031 | Schacht | Feb. 8, 1927 |
| 1,643,258 | Richter | Sept. 20, 1927 |
| 1,792,038 | Rossi | Feb. 10, 1931 |
| 1,859,104 | Munro | May 17, 1932 |
| 2,407,236 | Heiney | Sept. 10, 1946 |

FOREIGN PATENTS

| 44,315 | France | Oct. 1, 1934 |
| 545,841 | Great Britain | June 16, 1942 |